US011651276B2

(12) United States Patent
Ravizza et al.

(10) Patent No.: US 11,651,276 B2
(45) Date of Patent: May 16, 2023

(54) ARTIFICIAL INTELLIGENCE TRANSPARENCY

(71) Applicant: International Business Machines Corporation, Armonk, NY (US)

(72) Inventors: Stefan Ravizza, Wallisellen (CH); Andrea Giovannini, Zurich (CH); Patrick Lustenberger, Herrliberg (CH); Frederik Frank Flöther, Schlieren (CH); Thomas Pfeiffer, Frankfurt (DE)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 16/669,685

(22) Filed: Oct. 31, 2019

(65) Prior Publication Data

US 2021/0133621 A1    May 6, 2021

(51) Int. Cl.
*G06N 20/00* (2019.01)
(52) U.S. Cl.
CPC ..................... *G06N 20/00* (2019.01)
(58) Field of Classification Search
CPC .............................. G06N 20/00; G06N 5/045
See application file for complete search history.

(56) References Cited

U.S. PATENT DOCUMENTS

| 8,756,175 | B1 * | 6/2014 | Szegedy | G06N 20/00 706/12 |
| 2008/0103996 | A1 * | 5/2008 | Forman | G06N 20/00 706/12 |
| 2018/0322406 | A1 | 11/2018 | Merrill et al. | |
| 2019/0122135 | A1 * | 4/2019 | Parker | G06N 5/003 |

(Continued)

FOREIGN PATENT DOCUMENTS

| CN | 107392318 A | 11/2017 |
| CN | 108875815 A | 11/2018 |

(Continued)

OTHER PUBLICATIONS

"Q-learning", From Wikipedia, the free encyclopedia, printed Oct. 18, 2019, 7 pages. https://en.wikipedia.org/wiki/Q-learning#Algorithm.
Antell, "Prediction Explanation: Adding Transparency to Machine Learning", big ml, Blog, May 1, 2018, 6 pages. https://blog.bigml.com/2018/05/01/prediction-explanation-adding-transparency-to-machine-learning/.
Rodriguez, "Transparent Reasoning: How MIT Builds Neural Networks that can Explain Themselves", Towards Data Science, Medium, Sep. 12, 2018, 13 pages. https://towardsdatascience.com/transparent-reasoning-how-mit-builds-neural-networks-that-can-explain-themselves-3aea291cd9cc.

(Continued)

*Primary Examiner* — Jonathan Han
(74) *Attorney, Agent, or Firm* — Jeffrey M. Ingalls (57) ABSTRACT

A computer-implemented method for generating a group of representative model cases for a trained machine learning model may be provided. The method comprising determining an input space, determining an initial plurality of model cases, and expanding the initial plurality of model cases by stepwise modifying field values of the records representing the initial plurality of model cases resulting in an exploration set of model cases. Additionally, the method comprises obtaining a model score value for each record of the exploration set of model cases, continuing the expansion of the exploration set of model cases thereby generating a refined model case set, and selecting the records in the refined model case set based on relative record distance values and related model score values between pairs of records, thereby generating the group of representative model cases.

16 Claims, 5 Drawing Sheets

(56) References Cited

U.S. PATENT DOCUMENTS

| | | | |
|---|---|---|---|
| 2019/0147369 A1 | 5/2019 | Gupta et al. | |
| 2019/0156196 A1 | 5/2019 | Zoldi et al. | |
| 2019/0156544 A1 | 5/2019 | Tsuboi et al. | |
| 2021/0089828 A1* | 3/2021 | Arik | G06K 9/6231 |
| 2021/0103829 A1* | 4/2021 | Barshan | G06N 20/10 |

FOREIGN PATENT DOCUMENTS

| | | |
|---|---|---|
| CN | 108960409 A | 12/2018 |
| CN | 110163241 A | 8/2019 |
| KR | 1020190036254 A | 4/2019 |

OTHER PUBLICATIONS

Hosanagar et al., "We Need Transparency in Algorithms, But Too Much Can Backfire", Harvard Business Law, Technology, Jul. 25, 2018, 6 pages. https://hbr.org/2018/07/we-need-transparency-in-algorithms-but-too-much-can-backfire.

"Persona (user experience)", From Wikipedia, the free encyclopedia, printed Oct. 18, 2019, 5 pages. https://en.wikipedia.org/wiki/Persona_(user_experience).

International Search Report and Written Opinion, International Application No. PCT/IB2020/060161, Filing Date Oct. 29, 2020, Document Date Feb. 18, 2021, 8 pages.

* cited by examiner

ARTIFICIAL INTELLIGENCE TRANSPARENCY

BACKGROUND

The invention relates generally to the field of explainable AI (artificial intelligence), and more specifically, to a computer-implemented method for generating a group of representative model cases for a trained machine learning model. The invention relates further to a related representative case generation system for generating a group of representative model cases for a trained machine learning model, and a related computer program product.

The field of machine learning which is a sub-field of artificial intelligence in general studies techniques and algorithms that allow an automated completion of certain tasks without explicit instructions on how to achieve them. Machine learning approaches generally fall into three categories: supervised machine learning, unsupervised machine learning and reinforcement learning.

Supervised machine learning techniques are used to construct models which can be generalized from a set of labeled input data. This input data can be of various forms, e.g., images, audio sequences or sequences of actions, while the labels order the data points into different classes: pictures of cats or dogs, sequences that lead to success or to failure, etc.

Unsupervised machine learning techniques are used to find patterns, relationships and structures in data. The data points provided to the learner (i.e., learning system) are not labeled or classified, in contrast to supervised machine learning techniques.

Reinforcement learning concerns the behavior of software agents that act in an environment in order to maximize some notion of reward. The agent acts based on its state and knowledge about potential rewards/penalties. The technique has been refined, for instance, by introducing a "discount factor" that determine how far the agent should look into the future.

SUMMARY

According to one aspect of the present invention, a computer-implemented method for generating a group of representative model cases for a trained machine learning model may be provided. The method may comprise determining an input space for the trained machine learning model, determining, based on the determined input space, an initial plurality of model cases, wherein each model case may be represented by a record comprising a plurality of record fields with respective initial input values, and expanding the initial plurality of model cases by stepwise modifying field values of the records representing the initial plurality of model cases resulting in an exploration set of model cases.

The method may also comprise obtaining a model score value for each record of the exploration set of model cases, and continuing the expansion of the exploration set of model cases in direction of those modified model cases that provide one of a relatively high and a relatively low model score value compared to records of the exploration set. Thereby, a refined model case set may be generated.

Last but not least, the method may comprise selecting the records in the refined model case set based on relative record distance values and related model score values between pairs of records. Thereby, the group of representative model cases may be generated According to another aspect of the present invention, a related representative case generation system for generating a group of representative model cases for a trained machine learning model may be provided. The system may comprise a determination unit adapted for determining an input space for the trained machine learning model. Thereby, the determination unit may also be adapted for determining, based on the determined input space, an initial plurality of model cases, wherein each model case is represented by a record comprising a plurality of record fields with respective initial input values. Furthermore, the method may comprise an expansion module adapted for expanding the initial plurality of model cases by stepwise modifying field values of the records representing the initial plurality of model cases resulting in an exploration set of model cases and a model score obtaining unit adapted for obtaining a model score value for each record of the exploration set of model cases.

Additionally, the method may comprise a trigger unit adapted for continuing the expansion of the exploration set of model cases in direction of those modified model cases that provide one of a relatively high and a relatively low model score value compared to records of the exploration set, thereby generating a refined model case set, and a selection unit adapted for selecting the records in the refined model case set based on relative record distance values and related model score values between pairs of records, thereby generating the group of representative model cases.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'representative model case' may denote at least two types of model cases: those that are representing an average of input cases—which may also be seen as most representative—in order to generate a meaning for the outcome of the trained machine learning model. In contrast to representative model cases, there are extreme model cases having extreme values close to the edge/border of an input space of the trained machine learning model, and/or outliers that may cause issues during a classification or regression process of the trained machine learning model. For such cases, confidence level values may be extremely low compared to average cases. Additionally, also the number of false-negative or false-positive results for the trained machine learning model may be dramatically increased, i.e., wrong prediction results may be generated.

The term 'trained machine learning model' may be described as a set of hyper-parameters describing the internal functioning of the machine learning "black box". In the proposed concept, it may be assumed that these hyper-parameters are unknown. The hyper-parameters are developed inside the machine learning model during a training phase. During the training phase, in case of supervised machine learning, a larger amount of labeled data sets (records) may be used to learn an expected outcome according to the labels. This may apply for classifiers, typically implemented as neural networks. However, also regression models may be used as trained machine learning models in order to apply the proposed concept. Alternatively, the regression model may be reformulated as a clustering model.

The term 'input space' may denote ranges for fields of input records to the machine learning model such that meaning for the results are generated, i.e., classifications with a comparably high confidence level value. In simple words: the input space may define ranges for fields of attributes of input records in which the trained machine learning model functions as expected.

The term 'initial plurality of model cases' may denote an initial group of records representing the model cases used as initial data set to start the here proposed concept/method. These initial model cases/records may be generated randomly or according to another predefined algorithm. Also training data sets of validation data sets may be used as seed values.

The term 'exploration set of model cases' may denote an expanded set of records generated out of the initial plurality of model cases.

The term 'model score value' may denote typically a numerical value suitable to differentiate good models from bad models. One example of a model score value may be a confidence level value for a given input record.

The term 'refined model case set' may denote a set of model cases/records used as basis to select the most representative model cases and/or extreme model cases by a set of predefined selection methods.

The term 'selecting the records' may denote the activities performed in the selection phase of the proposed concept. The selection may be equivalent to grouping certain records, or even clustering certain records, in order to build groups representing the most representative model cases for the given trained machine learning model and or sample model cases at the border or the average of the input space for the given trained machine learning model.

The term 'relative record distance value' may denote a float number describing a level of similarity or a level of difference between two records. The year envisioned distance measure is the cosine distance. However, also other distance measuring concepts are possible and may equally support the proposed concept.

The term 'constraint' may denote a boundary condition under which new records may be generated representing additional model cases.

The term 'better supporting record' may denote a newly generated record starting from an existing record that respect and reflect the constraints during the generation process.

The term 'most relevant record' may denote an input record to the trained machine learning model representing an average input record (or a neighboring record), i.e., having values for the fields of the record that are each average to the input space of the machine learning model.

As AI applications have been proliferating, more and more questions regarding their transparency, explain ability, trustworthiness and testability have been raised. One of the reasons is that more complex—and possibly more accurate—machine learning models tend to have more of a black box character. More recently, the question of the controllability of AI systems has become more and more widespread. This led to the field of explainable AI (XAI) which tries to make the black box behaviors of AI systems more understandable.

The proposed computer-implemented method for generating a group of representative model cases for a trained machine learning model may offer multiple advantages, contributions and technical effects:

In general, the proposed method may allow a better understanding of an existing trained machine learning model in terms of clarity, transparency, testability, and explainability. To achieve this, most relevant cases and how they map to their results are isolated and presented to a user.

This goes clearly beyond such models that have been analyzed either as white boxes (i.e., the inner workings of the model are available for analysis) or just focused on the importance and coefficients of the input variables. In contrast, the here proposed concept focuses on machine learning models which may only be accessible as a black box, i.e., the internal structure (e.g., architecture and type of algorithm) are treated as unknown. Hence, no information about the algorithms used or the training data may be given. However, the trained model may be used to score examples and the output can be utilized for analysis. In addition to looking into the relevant features with the allocated importance, coefficients and other relevant measures, a novel approach is presented herewith to look into cases which are most relevant (e.g., typical cases versus outliers) for a given trained machine learning model.

It is believed that this approach may add another very relevant angle for analyzing such machine learning models, especially in the new era it is more and more the case that organizations are traded with such IP (Intellectual Property) but at the same time need to make sure that it is ethical and in line with the regulations such as GDPR (European General Data Protection Regulation).

The proposed method may be used to evaluate classification systems, like neural networks, but is not limited to such class of machine learning models. Additionally, the proposed method may also be used for regression models. The application to a regression model may be performed in multiple ways: (i) the regression problem may be converted into a classification problem by creating buckets. Then the algorithm may be applied to these buckets as proposed above.—(ii) Alternatively, a number of representative cases (i.e., records) may be defined using a random initialization. The initialized representative cases should then be moved in the input space with the optimization criteria of increasing the distance from each other in the output space; i.e., maximizing the distance in the input space should also be of interest in order to find different representative cases mapping to the same output.

Additionally, the proposed concept may be applied to both supervised machine learning models as well as unsupervised machine learning models because the proposed approach may treat the machine learning model as black box with a defined input and output space. The type of model is irrelevant for the proposed concept to work.

Furthermore, it may be noteworthy that the presented method may also be adapted to be independent of confidence level values. For that, only the assigned classes are considered. By exploring the input space (i.e., moving of the initial data points) each class may be mapped in the input space. A measure of centrality may then be used to find the most representative data points for an input cluster of a given class (e.g., considering cross entropy).

An additional benefit of this variation may be that the algorithm is not dependent on the amount of available training data. In the above-described case, high data availability for certain input space areas would lead to a higher confidence in that area since the algorithm has more data to learn from.

In the following, additional embodiments of the proposed method—also relevant for the related system—will be described:

According to one embodiment of the method, the determining the input space may comprise using predefined values for the fields of the records, or using a group of the training data of the trained machine learning model as seed records. The second approach may be supported by unsupervised learning to find a center group in the training data or another (typical) set of data relating to the machine learning model. Moreover, the determination of the input space may also be achieved by using outliers of records of the training data (or another typical set of data) of the trained machine learning model as seed records. Thus, a plurality of different approaches may be used to start the here proposed method with an initial set of model cases, i.e., typical records. Thereby, it may be assumed that each model case may be representable by a corresponding record. Furthermore, it should be mentioned that also the combination of the above proposed ways to determine the input space may be used.

According to one advantageous embodiment of the method the stepwise modification of the field values of the records may comprise (i) using, as basis for the modification, records of a group comprising a confidence level above a predefined high-confidence level value, or (ii) using, as basis for the modification, records of a group comprising a confidence level above a predefined low confidence level value, or (iii) using, as basis for the modification, records of a group with a predefined high range of range of confidence level values and/or a group with a predefined low range of range of confidence level values which are at the border of the input space. Hence, multiple options are available for modifying field values or features of the records describing the model cases.

According to embodiments of the method, the initial plurality of the model cases may be generated randomly, or by using a subset of training or validation data of the trained machine learning model. Thus, also here it may be chosen from different options during the initialization phase of the proposed method.

According to one optional embodiment of the method, the stepwise modification of the field values of the records representing the initial plurality of model cases may comprise modifying randomly one field value of a record at a time or, a plurality of field values of a related plurality of fields at a time. The second option may be a basis for even more randomness of model cases to be tested.

According to a further embodiment of the method, the stepwise modification of the field values of the records representing the initial plurality of model cases may comprise modifying one or more field values of a record at a time or a plurality of field values of a related plurality of fields under an influence of a constraint supporting a given target. Thus, the direction of change—i.e., the direction of modifications of available model cases—may be guided into certain (i.e., constrain-influenced) directions. This may improve a simple trial and error approach and may be more efficient during the exploration phase to generate new relevant model cases. For this, also different shooting approaches may be used: (i) potentially, the problem at hand may provide already some information which may be used advantageously here. (ii) A sensitivity analysis may provide the "deepest descent" which may give a direction in which the features (i.e., fields of the model case records) may need to be adjusted. (iii) Last but not least, heuristic optimization approaches may be applied which may comprise reinforcement learning, simulated annealing, genetic algorithms, tabu search or alike.

According to one advantageous embodiment, the method may also comprise interrupting the continuation of the expansion of the exploration set of model cases if (a) newly generated—i.e., by modification, see above—records for expanding the exploration set of model cases do not show a better support for the target—i.e., they remain more or less constant—than already available records in the exploration set of model cases, (b) a predefined number of records may be reached within the exploration set, (c) a predefined number of expansion cycles may have been performed, or (d) a preset time period ended. Therefore, various approaches are also possible here in order to limit the time and computational effort for the generation of a useful set of model cases for further processing.

According to an additional embodiment, the method may also comprise reducing the number of records in the refined model case set. This may be performed according to predefined rules in order to reach a useful number of model cases for the further processing. E.g., more or less similar record model cases (i.e., records) differing only slightly in one feature (i.e., one field of the record) may be eliminated in the refined model case set.

According to a further advanced embodiment, the method may also comprise selecting those records during the reduction using a distance measure representing the most relevant records of the clusters. Hence, also here different approaches may be used in order to reduce the refined model case set.

According to a preferred embodiment of the method, the distance measure may be a cosine similarity. However, also other distance measure algorithms may be used. It may also be mentioned, that the cosine similarity is known to be a measure of similarity between two non-zero vectors of an inner product space that measure the cosine of the angle between them.

In the following, a detailed description of the figures will be given. All instructions in the figures are schematic. Firstly, a block diagram of an embodiment of the inventive computer-implemented method for generating a group of representative model cases for a trained machine learning model is given. Afterwards, further embodiments, as well as embodiments of the representative case generation system for generating a group of representative model cases for a trained machine learning model, will be described.

Figure 1:
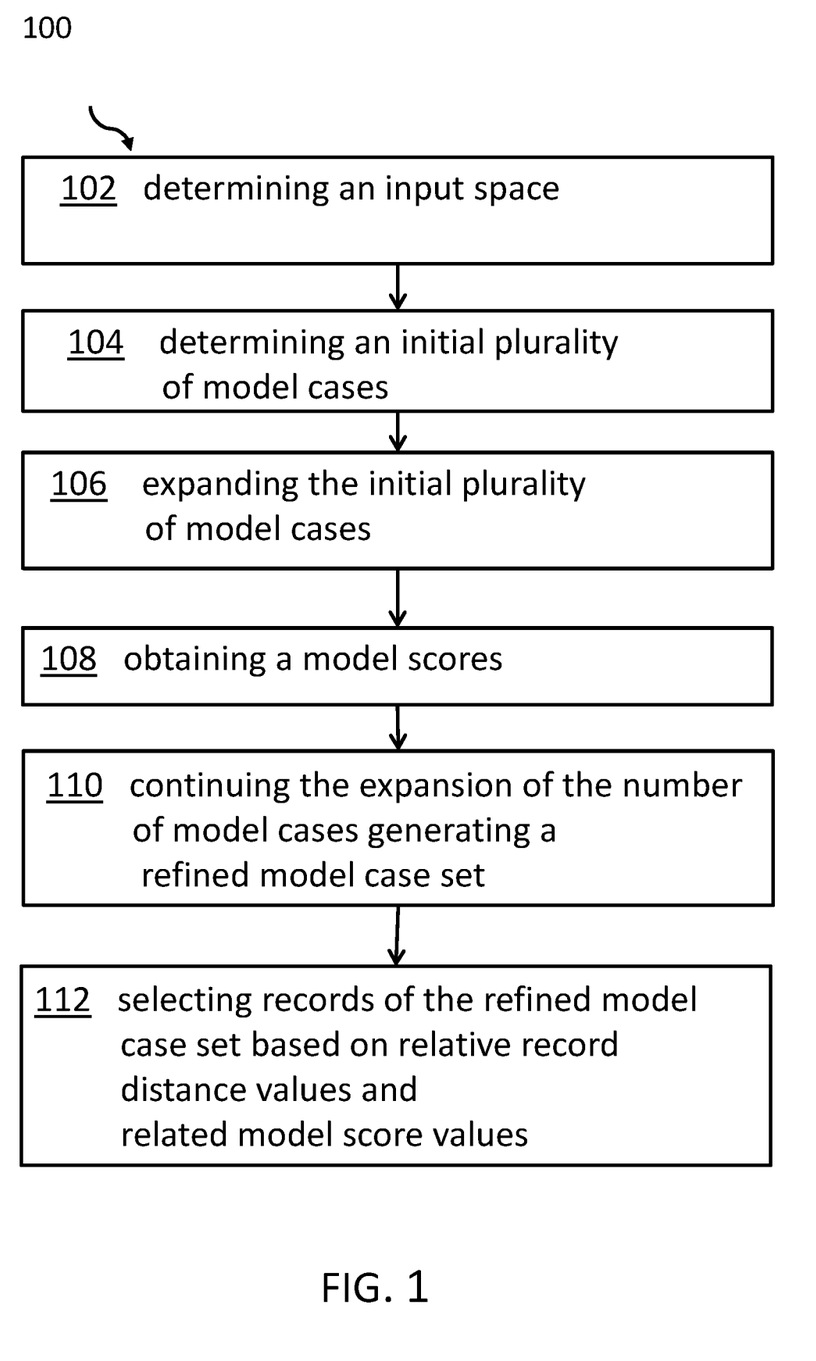
FIG. 1 shows a block diagram of an embodiment of the inventive computer-implemented method for generating a group of representative model cases for a trained machine learning model.

FIG. 1 shows a block diagram of a preferred embodiment of the computer-implemented method 100 for generating a group of representative model cases for a trained machine learning model. The method 100 comprises—in an initialization phase—determining, 102, an input space for the trained machine learning model. The method 100 comprises further determining, 104, based on the determined input space, an initial plurality of model cases, wherein each model case is represented by a record comprising a plurality of record fields—i.e., features of the record—with respective initial input values.

The method 100 also comprises—in an exploration phase—expanding, 106, the initial plurality of model cases by stepwise modifying field values of the records representing the initial plurality of model cases resulting in an exploration set of model cases. Thus, more records—of course within the input space are artificially generated in order to increase the number of model cases to be evaluated. Hence, the so generated amount of model cases is of course larger than the initial plurality. Also part of the exploration phase is obtaining, 108, a model score value for each record of the exploration set of model cases. As model score, e.g., the confidence level of each record may be used. Furthermore, this phase of the method 100 comprises continuing, 110, the expansion of the exploration set of model cases in direction of those modified model cases that provide one of a relatively high and a relatively low model score value compared to records of the exploration set. Thereby, a refined model case set is generated.

The term 'relatively high' means that model score value of a given model case can be compared to surrounding model cases (i.e., their related records) within a predefined distance, or, alternatively, relatively to all model cases in the refined model case set. Other, orientation points (e.g., predefined or dynamic threshold values) or regions for a comparison may also be selected. An equivalent approach may be used for the term 'relatively low'.

In the last phase, the selection phase, the method 100 comprises selecting, 112—which may also be interpreted as grouping or clustering—the records in the refined model case set based on relative record distance values and related model score values between pairs of records. Thereby, the group of representative model cases is generated and may be presented for comprehensibility reasons and interpretation to a user. Any data format may be useful; either in the listed form of numbers or in any suitable graphical form.

It may also be mentioned that instead of a determination of distances between pairs of records also alternative (or in combination with the distance measure) options are possible to be used as selection criteria. The selection process may be based on areas and their special characteristics in point clouds of records or a centrality of point clouds of records in a multidimensional space.

Figure 2:
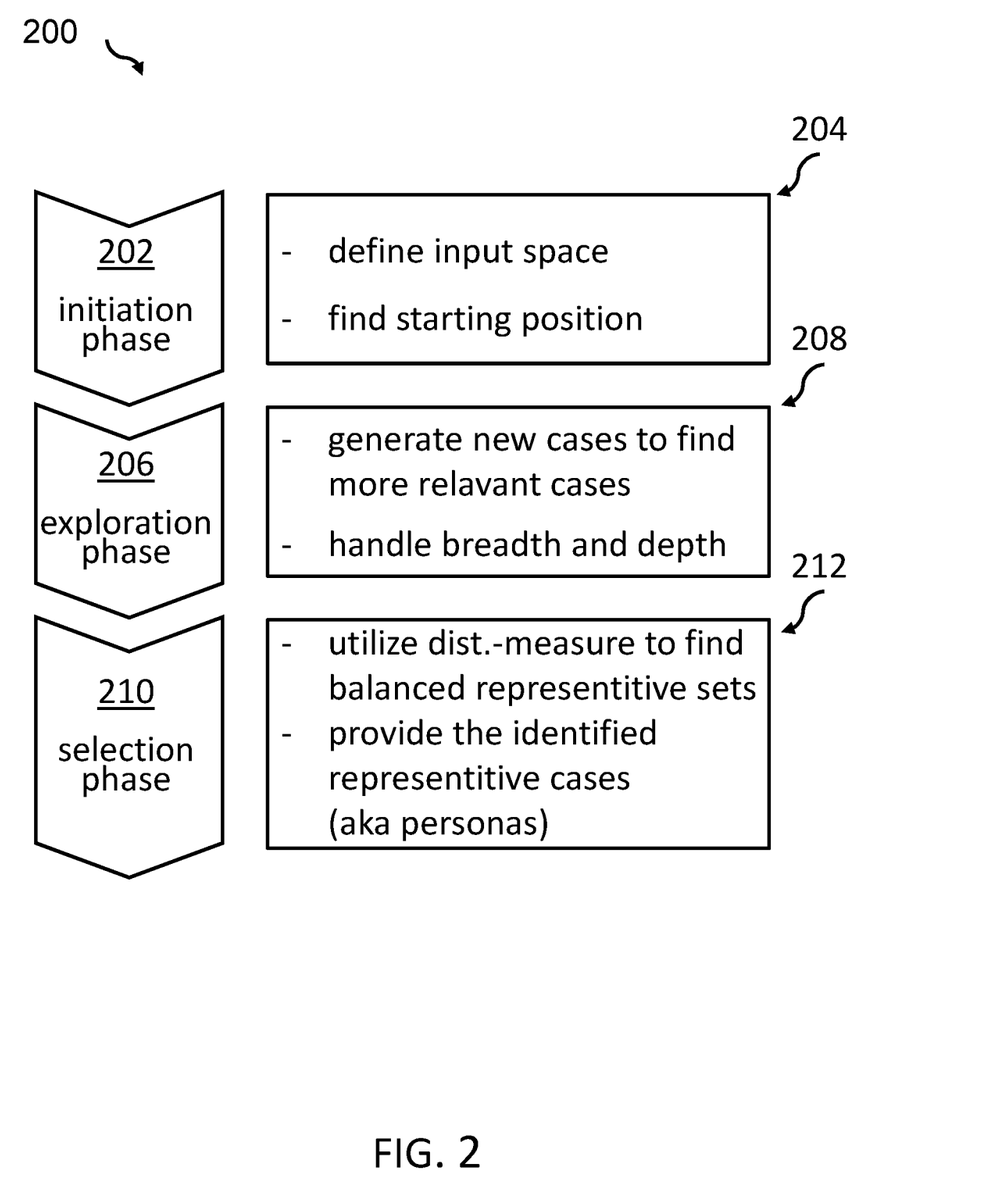
FIG. 2 shows a block diagram of a flow of different phases of the proposed method.

FIG. 2 shows a block diagram of the flow of different phases 200 of the proposed method 100. FIG. 2 may lead to other insights due to its more practical way describing the proposed method. During the initiation phase 202, a first step is that the approach "understands" how the input space—i.e., the list of possible ranges for each feature of each record/model case—is defined and/or where its limits are. Basically, this step deals with the question what is needed that the "black box" of trained machine learning model provides a score value of the machine learning model to a specific model case. This range may explicitly be given.

If it is not provided, a brute force approach can be used (extended with binary search and other optimizers) to find out for which they use the algorithm that may provide a useful scoring. A set of seeds (i.e., initial model cases to start from) needs to be generated. In the simplest approach, n random model cases can be generated which are in line with the examined input space. Additional approaches have already been described above and might be summarized here again: the seeds may be given in order to cover the input space. The general approach works with random seeds. However, it may be optimized for some instances to use seeds which are more tailored to a given problem. Alternative approaches can be based on already existing data sets which may later potentially be extended): (i) a subset of the available data set may be used; (ii) an unsupervised machine learning approach may be applied in order to, e.g., clustering such as a K-means-algorithm, in order to find "centers" of the clusters and use these "centers" as seed records. Alternatively (iii), an outlier detection of the data may be performed. The so identified model cases—especially the ones describing the most extreme model cases which are still within the input space of the algorithm—may be useful. Of course, a combination of the different approaches (i) to (iii) may be used.

Thus, the initiation phase 202 comprises the main activities 204 of defining an input space and finding a starting position.

The exploration phase 206 may also comprise two main activities 208: a generation of new model cases to find more relevant model cases, and measures in order to handle breadth and depth of the here proposed concept.

A first step in this phase is to define different targets and execute different sets for each target. It may be looked for model cases which have the highest confidence value for a given classification label. Alternatively, it may be looked for cases which have the lowest confidence value for a given classification label, but this confidence level is still the highest among all classes. Additionally, it may be looked for cases which have high or low confidence values and are at the "border" of the input space.

Then a scoring of the existing cases is performed. This is done to the initial start seed records and during later iterations to the newly generated model case sets.

In a third sub-step of this phase, each candidate model case is modified within the input space. Hence, actual values of one or more features of the records representing the model cases are modified so as to generate additional model cases. This may be done randomly or according to predefined constraints in order to see if a neighboring case is even more extreme/representative then the already provided one.

In a fourth sub-step, an iterative approach is performed which may stop when the different model cases cannot be more optimized, i.e., a modification does not improve the targets defined above and/or may stay constant over different iterations.

In order to improve the just-described trial and error approach and to be more efficient with the exploration of new relevant cases, different tuning approaches may be performed: (i) potentially, the problem at hand provides already some information which may be utilized; (ii) a sensitivity analysis may provide a direction of a "deepest descent" which may give a direction in which the features (field/attribute values of the records) of the current model cases may need to be adjusted; (iii) it additionally or alternatively, heuristic optimization approaches may also be applied like reinforcement learning, simulated and annealing, and genetic algorithms, tabu search or similar.

Several of these exploration approaches generate for one given model case several different neighboring cases. Both, the neighboring case (found by modifying an existing case) and the case with optimized target functions are kept in the set of model cases that continue in the next iterations.

Finally, a "memory" of analyzed model cases is updated so that only new cases will be further explored and unnecessary cycles and optimization can be avoided. Thus, generated model cases which are not used may be stored in an intermediate memory and may be compared with newly generated model cases to decide whether the case has been already generated in the past already. Thus, a deduplication process is inherent in the generation or new records or the exploration method portion.

The last phase, the selection phase 210, is characterizing the activities 212, namely, by utilizing a distance measured to find balanced representative model case set and to provide the identified representative model cases. These may also be described as personas.

At this point, it may be useful to explain a background aspect of the here proposed concept. In order to build trust into existing trained machine learning models, the requirement of a high transparency, i.e., explainable AI (XAI) and the concepts of Design Thinking have been brought together in order to demonstrate how the concept of representative cases—a well-known and rewarded concept in Design Thinking—can improve the transparency of AI models. Design Thinking refers generally to a set of processes and methods used to generate new designs and innovative ideas. In particular, this includes the concept of a persona, which is a fictional person who acts in a certain setting/interacts with a given product to bring the user into the center of a process or program. In this sense a persona is a representative (model) case.

Furthermore, the selection phase 220 may be described in more detail in the following way: after the exploration phase has ended with a set of model cases (i.e., potential records) for each target (e.g. constraint), the selection steps make sure that this number is reduced to a number which is expected from a user or a subsequent process in order to interpret the behavior of the trained machine learning model.

One or more distance measures are utilized to select the most relevant model cases. In general, global optima should be used and considered as final representative cases. In addition, also local optima may be relevant, but as the underlying solution space can consist of many of them, not all of them are equally relevant. A further selection process may be required.

It may be quite useful that the final set has a good spread of model cases within the input space (e.g., for medical algorithms they should consist of all age groups, both genders and a good balance between healthy and unhealthy people).

Distances between the model cases can be utilized to find model cases which are more isolated and potentially relevant. The calculation of the distances happens in the embedding space of the model cases. A case may thereby represented in the embedding space by coding each feature as a 0/1 value, leading to a vector of length N for each case, where N is the dimension of the input space. The preferred—but ultimately exemplary—metric used for the distance measure is a cosine similarity. In order to identify the isolated and potentially relevant cases, the relative distances between the set of model cases is calculated and central cases are identified in a hierarchical clustering fashion (e.g., by consolidating the cases from the bottom). This will lead to the most relevant "islands" or clusters, and the model case closest to the centroid of the cluster would be the one of the highest relevancy. It may be marked accordingly for highlighting it as an output of the here proposed concept.

The distance measure can be adjusted/dilated in favor of different features based on criteria such as model confidence, importance of the feature, personal interest, and so on. The final set of representative model cases is then treated as an output of the here proposed method. Depending on the configuration decided by a user, after the selection step, a new exploration step might start with model cases that reside from the last selection step.

It is also noteworthy that the here proposed concept may be used to generate a new set of validation data for the analyzed algorithm. The set of relevant cases should be enlarged to have a test or validation data set with a meaning for its size. This can be done by adjusting the parameters of the here proposed concept, e.g., making sure that the distance measure is not filtering too many local optima.

Other possible areas for utilizing the proposed concept are the following: it may be used to support and/or be integrated into active learning concepts in order to improve the performance. It may also be used to provide a set of model cases which are limited and meaningful. They may be viewed and checked if the scoring/prediction of the model is correct and can give a good indication if the model is useful. Such a check may be done by an official government authority to approve a specific trained machine learning model.

Furthermore, visualizations can be performed on how specific models cases are scored; they may be highlighted as areas showing weaker or stronger model cases. If, in addition, the labels to the found representative cases are available, it can be highlighted which parts of the input space have problems and should be excluded of the allowed input space in order to achieve good classification or regression results.

In order to render the representative model cases easier to understand, the the concept proposed here may be combined with the information which features are of great importance and provide the information of the representative model cases based on filtering or ranking based on the feature significance information.

Figure 3:
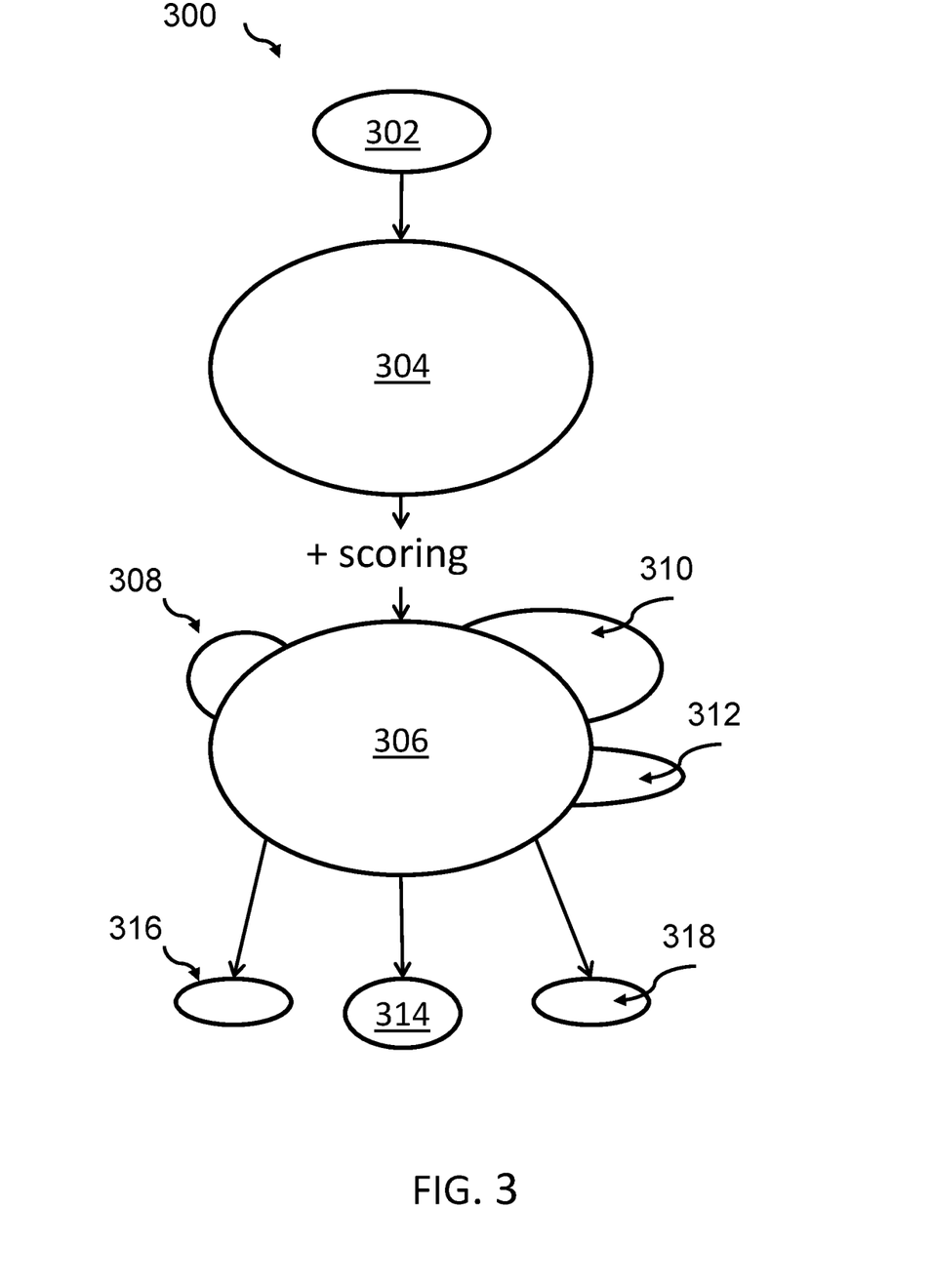
FIG. 3 shows a diagram of amounts of model cases generated and selected during an execution proposed method.

FIG. 3 shows a diagram 300 of amounts of model cases generated and selected during an execution of the proposed method. During the initiation phase 202, only a small number of records 302 may exist, e.g., the seed records. Then, during the exploration phase 206 (see FIG. 2), the number of records 304 is expanded. Together with a scoring (and potentially constraints) of the records, additional areas 308, 310, 312 of records may be added depending on the direction the expansion happens (depending on the constraints model used), leading to the combined record space 306 (including records of the array as 308, 310, 312). Finally, during the selection phase 210 (see FIG. 2) the model cases representing the functioning of a trained machine learning model in a typical way or, as outliers on the border of the input space are shown as relatively small number of records—i.e., model cases—316, 314, 318.

Figure 4:
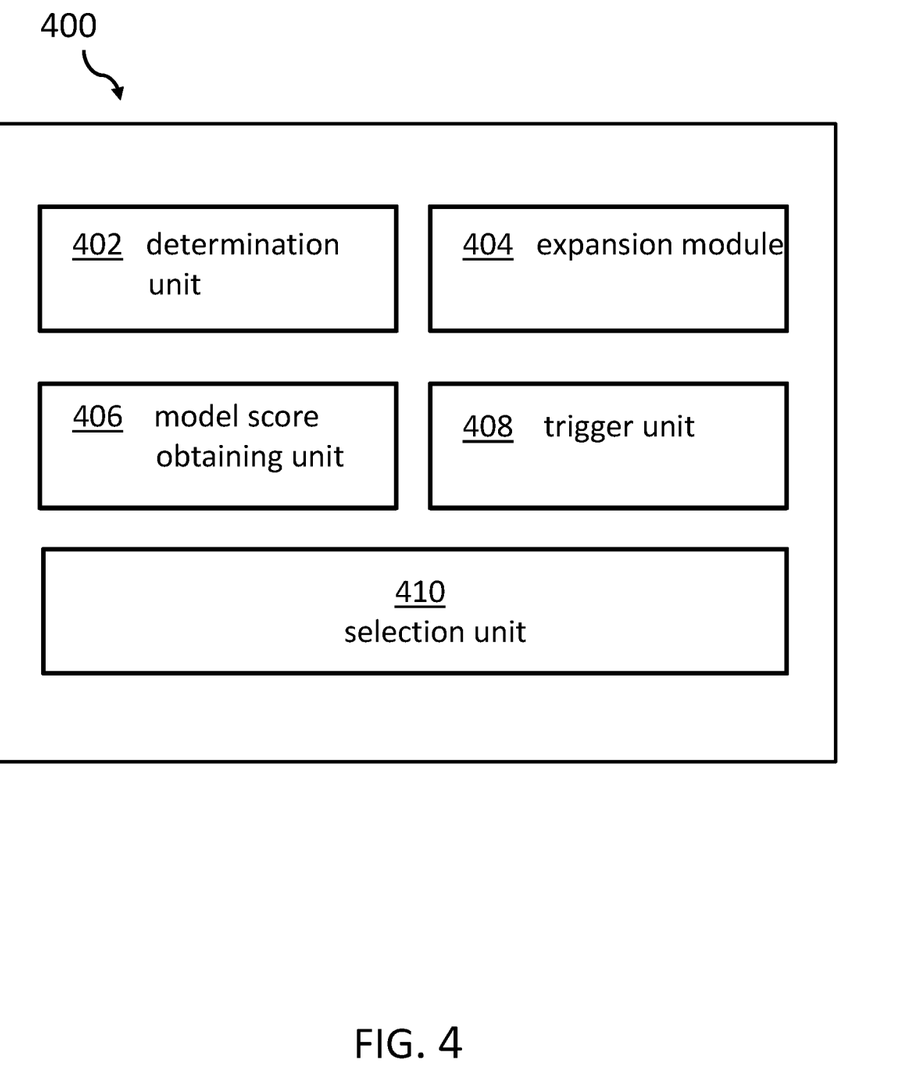
FIG. 4 shows a block diagram of an embodiment of the representative case generation system.

For completeness reasons, FIG. 4 shows a block diagram of an embodiment of the representative case generation system 400 for the trained machine learning model. The system 400 comprises a determination unit 402 adapted for determining an input space for the trained machine learning model. Also here, the determination unit is also adapted for determining, based on the determined input space, an initial plurality of model cases. Thereby, each model case is represented by a record comprising a plurality of record fields with respective initial input values.

The system 400 also comprises an expansion module 404 adapted for expanding the initial plurality of model cases by stepwise modifying field values of the records representing the initial plurality of model cases resulting in an exploration set of model cases, and a model score obtaining unit 406 adapted for obtaining a model score value for each record of the exploration set of model cases. Last but not least, the system 400 comprises a trigger unit 408 adapted for continuing the expansion of the exploration set of model cases in direction of those modified model cases that provide one of a relatively high and a relatively low model score value compared to records of the exploration set, thereby generating a refined model case set, and a selection unit 410 adapted for selecting the records in the refined model case set based on relative record distance values and related model score values between pairs of records, thereby generating the group of representative model cases.

Figure 5:
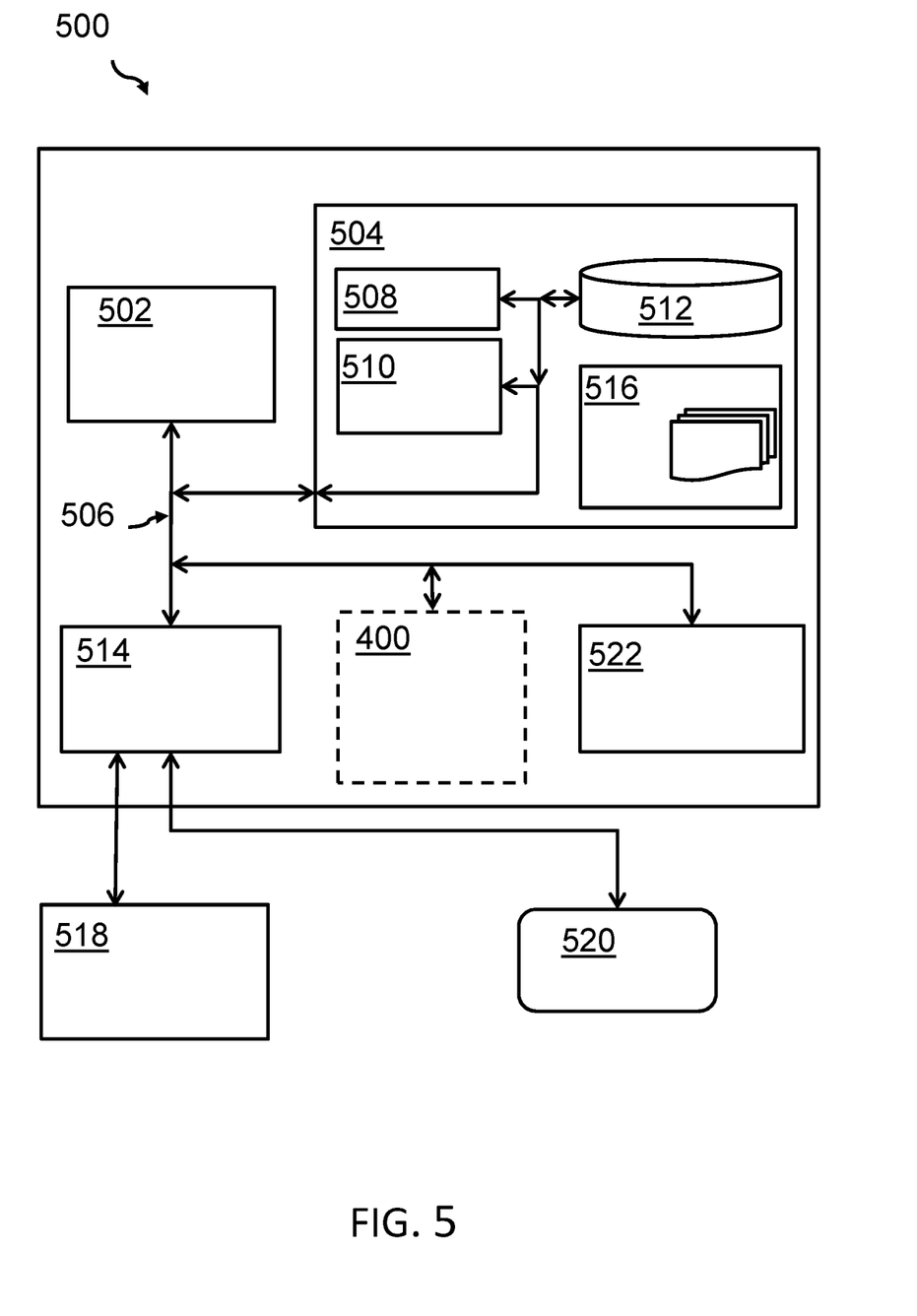
FIG. 5 shows an embodiment of a computing system comprising the representative case generation system according to FIG. 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the representative case generation system 400 for generating a group of representative model cases for a trained machine learning model may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for generating a group of representative model cases for a trained machine learning model, the method comprising:
   determining an input space for the trained machine learning model;
   determining, based on the determined input space, an initial plurality of model cases, wherein each model case is represented by a record comprising a plurality of record fields with respective initial input values;
   expanding the initial plurality of model cases by stepwise modifying field values of records representing the initial plurality of model cases resulting in an exploration set of model cases;
   obtaining a model score value for each record of the exploration set of model cases;
   continuing the expansion of the exploration set of model cases in direction of those modified model cases that provide one of a relatively high and a relatively low model score value compared to records of the exploration set, thereby generating a refined model case set;
   selecting records in the refined model case set based on relative record distance values and related model score values between pairs of records, thereby generating the group of representative model cases; and
   reducing the number of records in the refined model case set by selecting those records using a distance measure representing the most relevant records for each of a plurality of clusters using a clustering model.

2. The method according to claim 1, wherein determining the input space comprises:
   using predefined values for the fields of records, or
   using a group of training data of the trained machine learning model as seed records, or
   using outlier of records of the training data of the trained machine learning model as seed records.

3. The method according to claim 1, wherein the stepwise modification of the field values of records comprises:
   using as basis for the modification records of a group comprising a confidence level above a predefined high confidence level value, or
   using as basis for the modification records of a group comprising a confidence level above a predefined low confidence level value, or
   using as basis for the modification records of a group with a predefined high range of range of confidence level values and/or a group with a predefined low range of range of confidence level values which are at the border of the input space.

4. The method according to claim 1, wherein the initial plurality of the model cases is generated randomly or using a subset of training or validation data of the trained machine learning model.

5. The method according to claim 1, wherein the stepwise modification of the field values of records representing the initial plurality of model cases comprises modifying randomly one field value of a record at a time or a plurality of field values of a related plurality of fields at a time.

6. The method according to claim 1, wherein the stepwise modification of the field values of records representing the initial plurality of model cases comprises modifying one or more field values of a record at a time or a plurality of field values of a related plurality of fields under an influence of a constraint supporting a given target.

7. The method according to claim 6, further comprising interrupting the continuation of the expansion of the exploration set of model cases if:
   newly generated records for expanding the exploration set of model cases do not show a better support for the target than already available records in the exploration set of model cases,
   a predefined number of records is reached within the exploration set,
   a predefined number of expansion cycles has been performed, or
   a preset time period ended.

8. The method according to claim 1, wherein the distance measure is a cosine similarity.

9. A representative case generation system for generating a group of representative model cases for a trained machine learning model, the system comprising at least one processor and a memory storing program instructions thereon, the program instructions executable by the at least processor to cause the system to perform a method comprising:
- determining an input space for the trained machine learning model;
- determining, based on the determined input space, an initial plurality of model cases, wherein each model case is represented by a record comprising a plurality of record fields with respective initial input values;
- expanding the initial plurality of model cases by stepwise modifying field values of records representing the initial plurality of model cases resulting in an exploration set of model cases;
- obtaining a model score value for each record of the exploration set of model cases;
- continuing the expansion of the exploration set of model cases in direction of those modified model cases that provide one of a relatively high and a relatively low model score value compared to records of the exploration set, thereby generating a refined model case set;
- selecting records in the refined model case set based on relative record distance values and related model score values between pairs of records, thereby generating the group of representative model cases; and
- reducing the number of records in the refined model case set by selecting those records during using a distance measure representing the most relevant records for each of a plurality of clusters using a clustering model.

10. The system according to claim 9, wherein determining the input space comprises:
- using predefined values for the fields of records, or
- using a group of training data of the trained machine learning model as seed records, or
- using outlier of records of the training data of the trained machine learning model as seed records.

11. The system according to claim 9, wherein the stepwise modification of the field values of records comprises:
- using as basis for the modification records of a group comprising a confidence level above a predefined high confidence level value, or
- using as basis for the modification records of a group comprising a confidence level above a predefined low confidence level value, or
- using as basis for the modification records of a group with a predefined high range of range of confidence level values and/or a group with a predefined low range of range of confidence level values which are at the border of the input space.

12. The system according to claim 9, wherein the initial plurality of the model cases is generated randomly or using a subset of training or validation data of the trained machine learning model.

13. The system according to claim 9, wherein the stepwise modification of the field values of records representing the initial plurality of model cases comprises modifying randomly one field value of a record at a time or a plurality of field values of a related plurality of fields at a time.

14. The system according to claim 9, wherein the stepwise modification of the field values of records representing the initial plurality of model cases comprises modifying one or more field values of a record at a time or a plurality of field values of a related plurality of fields under an influence of a constraint supporting a given target.

15. The system according to claim 14, wherein the method further comprises interrupting the continuation of the expansion of the exploration set of model cases if:
- newly generated records for expanding the exploration set of model cases do not show a better support for the target than already available records in the exploration set of model cases,
- a predefined number of records is reached within the exploration set,
- a predefined number of expansion cycles has been performed, or
- a preset time period ended.

16. A computer program product for generating a group of representative model cases for a trained machine learning model, the computer program product comprising a computer readable storage medium having program instructions embodied therewith, the program instructions executable by at least one processor to cause the at least one processor to perform a method comprising:
- determining an input space for the trained machine learning model;
- determining, based on the determined input space, an initial plurality of model cases, wherein each model case is represented by a record comprising a plurality of record fields with respective initial input values;
- expanding the initial plurality of model cases by stepwise modifying field values of records representing the initial plurality of model cases resulting in an exploration set of model cases;
- obtaining a model score value for each record of the exploration set of model cases;
- continuing the expansion of the exploration set of model cases in direction of those modified model cases that provide one of a relatively high and a relatively low model score value compared to records of the exploration set, thereby generating a refined model case set;
- selecting records in the refined model case set based on relative record distance values and related model score values between pairs of records, thereby generating the group of representative model cases; and
- reducing the number of records in the refined model case set by selecting those records using a distance measure representing the most relevant records for each of a plurality of clusters using a clustering model.

* * * * *